United States Patent Office 2,942,994
Patented June 28, 1960

2,942,994

THERMOPLASTIC COMPOSITIONS

Wayne A. Proell, Chicago, Ill., and Norman J. Bowman, Hammond, Ind., assignors to Standard Oil Company, Chicago, Ill., a corporation of Indiana No Drawing. Filed Oct. 27, 1954, Ser. No. 465,132

9 Claims. (Cl. 106—178)

This invention relates to thermoplastic compositions and more particularly to polymers plasticized with nitrodiphenyl ethers.

Heretofore, plastic compositions have generally consisted of a major portion of plasticizable polymeric material plasticized with a minor amount of plasticizer which is liquid at ambient temperatures. These plastic compositions have been prepared by the use of a common solvent for the polymeric material and the plasticizer.

Among the objects of this invention is the production of new and useful plasticizer compositions of plasticizable, thermoplastic organic polymeric materials. Another object of the invention is the production of thermoplastic compositions containing a predominance of plasticizer material. Still another object of the invention is to produce a plasticized composition without the use of a common solvent for the polymer and the plasticizer. A further object is to plasticize a polymeric material by simple heating of the polymeric material with the plasticizer. An additional object is to plasticize thermoplastic polymeric resins with plasticizers which are solid at ambient temperatures. A still further object of the invention is to plasticize a thermoplastic resin with a plasticizer having low volatility characteristics which plasticizer will not be lost from the plasticized composition by evaporation. A particular object of the invention is to provide a method for the production of 2,4-dinitrodiphenyl ether in high yields. Other objects of the invention will be apparent from the description thereof set out hereinbelow.

The thermoplastic compositions of this invention comprise a thermoplastic polymeric organic material and at least one nitrodiphenyl ether containing from one to three nitro groups per molecule, and not more than two nitro groups on any benzene nucleus which compositions may contain in addition an oxygenated organic adjunct which is capable of plasticizing to a significant degree the thermoplastic polymeric material.

The term nitrodiphenyl ether is defined in this specification and claims as a nitrodiphenyl ether containing from one to three nitro groups per molecule and substantially not more than two nitro groups on any benzene nucleus. Examples of these are orthonitrodiphenylether, 2,4-dinitrodiphenyl ether, 2,2'-dinitrodiphenyl ether, and 2,2',4-trinitrodiphenyl ether. Mixtures of these nitrodiphenyl ethers may be used. However, it is preferred that the aggregate number of nitro groups in said mixtures be not more than about 2.5 nitro groups per molecule.

It is to be understood that commercial products predominating in diphenyl ether may be used as intermediates for the production of the nitrodiphenyl ether products in preparing the plasticizer for our thermoplastic compositions. Thus Dowtherm A, an eutectic mixture containing about 73.5% diphenyl ether and 26.5% diphenyl, may be used as an intermediate for the production of mixtures comprising mononitrodiphenyl ethers with dinitrodiphenyl ethers and mixture of trinitrodiphenyl ethers with these nitrodiphenyl ethers containing less nitro substituent groups than trinitrodiphenyl ethers. The term "mixtures of monodiphenyl ether and dinitrodiphenyl ether and mixtures of the foregoing with trinitrodiphenyl ether" and in general the term "nitrodiphenyl ether" as used in this specification and in the claims based thereon includes nitrodiphenyl ethers and mixtures of nitrodiphenyl ethers produced from Dowtherm A.

The nitrodiphenyl ether plasticizers may be prepared by different methods well known to those skilled in the art. Thus a relatively pure nitrodiphenyl ether may be prepared by the Williamson reaction wherein a nitromonochlorobenzene such as 2,4-chlorobenzene is reacted with phenol or a mononitrophenol such as orthonitrophenol in the presence of caustic to produce 2,4-dinitrodiphenyl ether or 2,2',4-trinitrodiphenyl ether. Mixtures of mononitro-dinitro- and trinitrodiphenyl ethers can be prepared by direct nitration of diphenyl ether and such mixtures are separable into fractions predominantly mononitrodiphenyl ethers, dinitrodiphenyl ethers and trinitrodiphenyl ethers by digestion of nitrated products with alcohol in which solvent the nitrodiphenyl ethers exhibit variable solubility. Thus when digested with alcohol at ambient temperatures the mononitrodiphenyl components are dissolved in the alcohol and can be obtained therefrom by crystallization. Hot alcohol is used to separate the dinitrodiphenyl ethers from trinitrodiphenyl ethers, the dinitrodiphenyl ethers being more soluble in hot alcohol than are the trinitrodiphenyl ethers.

The plasticizable component of the composition consists of an organic polymeric material which has thermoplastic properties. Illustrations of this material are cellulose esters, cellulose ethers, polyvinyl resins, methylmethacrylate resins, natural rubber, synthetic rubber, asphalt, polystyrenes, styrene-acrylonitrile copolymers and polyisobutylene. The preferred thermoplastic organic polymeric materials are resins selected from the class consisting of cellulose esters, polyvinyls, methylmethacrylate resins and mixtures of these.

Illustrative examples of the various classes of thermoplastic organic polymeric materials are set out. Cellulose esters: cellulose acetate, cellulose acetate-propionate, cellulose acetate-butyrate and cellulose nitrate (nitro cellulose). Polyvinyl resins: polyvinyl acetate, polyvinyl chloride and polyvinyl acetate-chloride. Cellulose ethers: ethyl cellulose, ethyl-methyl cellulose and methyl cellulose. Polystyrenes: polyvinyl benzene, polyvinyl toluenes, and polyvinyl xylenes. Synthetic rubber: GRS and butyl rubber. Asphalts: oxidized petroleum residuums and natural asphalt such as gilsonite.

In addition to the defined nitrodiphenyl ether and the thermoplastic polymeric organic material the composition may contain an oxygen containing organic adjunct material. This organic adjunct material is, in itself, capable of plasticizing to a significant degree the particular polymeric organic material in the composition. By the addition of the adjunct matter it is possible to obtain compositions having markedly different properties from the two component compositions.

The preferred adjunct materials are selected from the class consisting of (1) esters of polyhydric alcohols, (2) polyglycols, (3) alkyl ethers of polyglycols, (4) aliphatic ethers of nitrophenols, (5) esters of polycarboxylic acids and (6) nitromonocyclic aromatic compounds.

Illustrative examples of adjunct materials are set out below:

*Ester of polyhydric alcohols:*
Monoacetin
Diacetin
Triacetin
Hydroxyethylacetate

*Ester of polyhydric alcohols*—Continued
>
> Ethylene glycol diacetate
> Diethylene glycol diacetate
> Triethylene glycol diacetate
> Triethylene glycol di-2-ethylhexoate
> Polyethylene glycol di-2-ethylhexoate
> Nitromethylpropanediol diacetate

*Polyglycols*:
> Diethylene glycol
> Triethylene glycol
> Polyethylene glycol (200)
> Dipropylene glycol

*Alkyl ethers of polyglycols*:
> Dimethoxy tetraglycol
> Diethoxy tetraglycol

*Nitromonocyclic aromatics*:
> Dinitrobenzene
> Nitrotoluene
> Dinitrotoluene

*Aliphatic ethers of nitrophenols*:
> Dinitrophenyl propyl ether
> Dinitrophenyl allyl ether

*Esters of polycarboxylic acids*:
> Methyl carbitol diglycolate
> Di-methylallyl diglycolate
> Dibutyl diglycolate
> Triethyl citrate
> Trimethyl citrate
> Acetyl triethyl citrate
> Dimethyl phthalate
> Diethyl phthalate
> Dibutyl phthalate
> Dioctyl phthalate
> Ethyl glycolatyl methyl phthalate
> Dimethyl nitrophthalate

*Polymeric esters*:
> Glycol maleate
> Diethylene glycol oxalate
> Ethylene glycol diglycolate
> Diethylene glycol diglycolate

*Note.*—The polymeric esters may properly be included in both the class of esters of polycarboxylic acids and esters of polyhydric alcohols.

The thermoplastic composition comprises one or more of the defined thermoplastic polymers and one or more of the defined nitrodiphenyl ethers. In general sufficient nitrodiphenyl ether is present to substantially change the thermoplastic characteristics of the thermoplastic polymer component. The compositions which contain a thermoplastic polymer and a nitrodiphenyl ether should contain between about 20% and about 80% by weight, of the thermoplastic polymer and between about 80% and about 20% of the nitrodiphenyl ether. The thermoplastic composition may contain adjunct plasticizer in addition to the nitrodiphenyl ether to make up the total of 80% to 20% plasticizer material.

In the composition comprising essentially the thermoplastic polymeric material, the nitrodiphenyl ether and the adjunct material, the relative amounts of nitrodiphenyl ether and adjunct material are varied to obtain the composition having the desired thermoplastic properties. In general, the amount of thermoplastic polymeric material in the composition will be in the range of from about 20% to about 60% by weight. Generally, the plasticizer component will contain from about 20% to 70% of adjunct material and from 30% to 80% of nitrodiphenyl ether. More usually the total plasticizer material will contain about equal weights of nitrodiphenyl ether and adjunct material.

In preparing the composition of this invention the nitrodiphenyl ether is heated to produce a molten mass to which the thermoplastic polymeric material is then added incrementally and the mixture is stirred to produce a homogeneous liquid. When an adjunct plasticizer is used we heat the adjunct and add the defined nitrodiphenyl ether to the hot adjunct to produce a homogeneous mixture of these before the addition of the polymeric material to be plasticized. In general, the defined nitrodiphenyl ethers and their mixtures melt at temperatures below about 75° C. The temperature to which the plasticizer material is heated is dependent on the decomposition temperature of the components of the plasticizer material and on the decomposition temperature and on softening properties of the thermoplastic polymeric material to be plasticized. Thus to plasticize the synthetic resins such as cellulose acetate-butyrate, polyvinyl chloride, polymethylmethacrylate, styrene-acrylonitrile copolymers, polyvinyl acetate, polyvinyl butyral and their mixtures with the nitrodiphenyl ethers and with mixtures of nitrodiphenyl ethers and adjunct plasticizers, temperatures up to 150° C. may be used. In general, temperatures in the range of from about 120° C. to 140° C. are preferred for plasticizing these synthetic resins. Lower temperatures may be used for producing plasticized compositions from asphalt and rubber polymeric material.

When cooled to ambient temperatures, the plasticized polymeric material, in thin films, varies with respect to transmission of light from substantially complete transparency to opaqueness and in rigidity from a tough horny material to a rubbery and more pliable plasticized composition, depending on the thermoplastic polymeric material used in the composition. The finished compositions do not exhibit syneresis of plasticizer and/or adjunct plasticizer.

The thermoplastic compositions of this invention may also be prepared by the conventional method of use of a common solvent for the thermoplastic polymeric material and the nitrodiphenyl ether plasticizer, with or without adjunct material.

A cellulose acetate which is particularly useful in this invention is a partially esterified cellulose acetate described as having an acetic acid content between about 51 and 57 percent by weight. The term "percent by weight acetic acid" denotes the amount of acetic acid obtained on saponification of the cellulose acetate and is expressed as percent of the initial material. Particularly good results are obtained when using the commercial grade of cellulose acetate known as lacquer grade. Lacquer grade cellulose acetate is described in addition to its acetic acid content by its viscosity, when dissolved in acetone, of between about 2 and 80 centipoises at 25° C. Hereinafter the term "viscosity" as applied to cellulose acetate denotes the viscosity of an acetone solution containing 20 percent by weight of the cellulose acetate.

Another particular cellulose ester especially suitable as thermoplastic polymeric material for purpose of this invention is cellulose acetate-butyrate. This cellulose acetate-butyrate is a partially esterified cellulose acetate-butyrate, having an acetic acid content between about 7 and 55% by weight and a butyric acid content between about 16% and 61% by weight and has a viscosity between about 10 and about 40 centipoises. We have found that compositions containing the cellulose acetate-butyrate polymeric material should contain from about 20% to about 60% by weight of cellulose acetate-butyrate, and from about 40% to about 80% by weight of nitrodiphenyl ether plasticizer selected from the class of mononitrodiphenyl ether, dinitrodiphenyl ether, mixtures of mononitrodiphenyl ether and dinitrodiphenyl ether and mixtures of these with trinitrodiphenyl ether in which there is an average of less than 2.5 nitro groups per molecule and essentially not more than two nitro groups are present on any benzene nucleus.

A particularly effective adjunct plasticizer for use in conjunction with the nitrodiphenyl ether plasticizers of our invention is ethylene glycol diglycolate. This material is a polyester and is a product of the polyester condensation of ethylene glycol with diglycolic acid wherein a molar excess of the alcohol is used. The dihydric alcohols used in the preparation of such class of adjunct plasticizers may be selected from at least one of the class consisting of ethylene glycol, polyethylene glycol, propylene glycol, polypropylene glycol, n-butylene glycol and poly n-butylene glycol. The polyglycols must have a molecular weight of less than 400 in order to produce a polyester of the desired properties. The dicarboxylic acids utilized in the preparation of this class of adjunct plasticizers are selected from the class consisting of aliphatic dicarboxylic acids and aliphatic oxydicarboxylic acids, which acids have between two and six carbon atoms in the molecule. Examples of the oxydicarboxylic acids are diglycolic acid, i.e., oxydiacetic acid, oxyacetic-propanoic acid and oxydipropanoic acid. Examples of the dicarboxylic acids are malonic acid, succinic acid, glutaric acid and adipic acid. It is preferred to use the oxydicarboxylic acids in the preparation of this adjunct plasticizer.

The molecular weight of the product of the polyesterification reaction is related to its efficiency as an adjunct plasticizer. A low molecular weight is desirable, which low molecular weight is obtained by using a molar excess of alcohol, i.e., glycol, to acid. The mol ratio of the alcohol to acid should be between about 1.02 and 1.3, preferably between about 1.15 and 1.25. The molecular weight of the polyester preferably should be not more than about 6,000.

The plasticized thermoplastic resin should contain from about 20% to about 60% by weight, preferably from about 25% to about 45% by weight of this polyester condensation product when it is used in conjunction with our nitrodiphenyl ether plasticizer for plasticizing cellulose acetate.

The nitrodiphenyl ether plasticizers of this invention may be produced by different methods depending upon the number of nitro groups per molecule desired and on whether mixtures of the nitrodiphenyl ethers or a sole compound of such class is desired. A particularly effective nitrodiphenyl plasticizer is 2,4-dinitrodiphenyl ether. We have discovered a method for preparing 2,4-dinitrodiphenyl ether in high yields of relatively pure product. The method consists of forming at a temperature below about 100° C., preferably in the range of 50° C. and 80° C., a reaction mixture of 2,4-dinitrochlorobenzene and phenol, the mol ratio of phenol to the 2,4-dinitrochlorobenzene in said reaction mixture being within the range of 1.01 to 1.1. The molten mixture is stirred and an aqueous solution of an alkali metal hydroxide is added to the mixture. Preferably a concentration of caustic soda within the range of from about 25% to about 55% is added to the reaction mixture in successive increments to provide in the reaction mixture an excess of caustic not greater than about 10 mol percent based on the unreacted phenol in the reaction mixture. As the caustic is added the temperature of the reaction mixture rises and the addition of the caustic solution is adjusted to prevent the temperature from going above 100° C. The temperature is preferably held below about 90° C. Control of the rate of caustic solution addition, control of temperature, and avoidance of proportionately large amounts of water in the mixture reduces to a minimum the hydrolysis of 2,4-dinitrochlorobenzene intermediate and consequent formation of by-product impurities. As the water from the caustic solution and water produced by the reaction accumulates in the reaction mixture a slurry is formed. This slurry is diluted with water and the diluted slurry is cooled to a temperature below about 70° C. to cause crystallization of the product. The crystallized product is separated from the aqueous slurry, melted and reslurried in hot water, that is, water at a temperature above about 60° C. but lower than about 85° C., and the mixture is cooled to cause recrystallization of the product. The melting and reslurrying step may be repeated several times to obtain high purity product. Prior to the final separation of pure product the slurried product is neutralized. The final product is separated from the neutralized slurry and is washed and dried to a water content of less than about 5%. Yields of about 95% or more are obtained.

Illustrative examples of plasticized compositions comprising thermoplastic polymeric material and nitrodiphenyl ethers and also method of preparing specific nitrodiphenyl ethers plasticizers are set out below.

PREPARATION OF 2,4-DINITRODIPHENYL ETHER

A mixture of 98 pounds of technical grade 2,4-dinitrochlorobenzene and 48.2 pounds of phenol were introduced to a 50 gallon reaction vessel equipped with a ¾" copper tubing coil around the inside wall of the vessel. The mixture which contained an excess of 7 mol percent phenol was stirred with a mechanical stirrer and liquified by passing steam through the coil, the temperature of the molten mixture being about 50° C. Heating of the mixture was discontinued and while stirring the mixture an aqueous solution of sodium hydroxide containing 21.6 pounds of sodium hydroxide dissolved in 20 liters of water was added incrementally to the mixture by means of a 2 liter dropping funnel. The total amount of caustic added to complete the reaction corresponded to an excess of about 5 mol percent based on the phenol in the mixture. After a brief induction period the temperature increased gradually to 80° C. and was then held in the 80°–90° C. range by controlling the rate of addition of caustic solution. At the completion of addition of the caustic solution the temperature of the mixture was 89° C. and remained above 80° C. for an additional hour during which time stirring was continued. The total time from the initiation of the reaction to completion of the reaction was about three hours. At completion of the reaction the mixture was in the form of a thin slurry of product in the water formed by the reaction and water which had been added, i.e., 20 liters, as solvent for the caustic. The slurry was diluted with about 40 gallons of hot water, that is, about 60° C., and the diluted slurry was permitted to cool to ambient temperature, stirring being continued during the cooling operation. As the slurry cooled the 2,4-dinitrodiphenyl ether crystallized and the crystallized product was allowed to settle. The aqueous liquor was decanted and the crude precipitated product was remelted and reslurried with hot water. This wash procedure was repeated four times. During the third wash the mixture was acidified to a pH of about 5 with hydrochloric acid. The washing procedure removed unreacted phenol, sodium chloride and a minor amount of sodium dinitrophenoxide by-product, which was formed as a result of hydrolysis of dinitrochlorobenzene intermediate. The 2,4-dinitrodiphenyl ether was filtered and washed repeatedly and finally dried at ambient temperatures over a period of about 70 hours to a moisture content of about 5%. Yield on a completely dry basis was 125.7 pounds corresponding to 94.4% of theoretical.

PREPARATION OF TRINITRODIPHENYL ETHER

Trinitrodiphenyl ether was prepared according to the following procedure:

Two hundred grams of 2,4-dinitrodiphenyl ether, prepared according to the procedure described in Example 1, was introduced into a 1500 ml. triple neck flask immersed in a cooling bath and fitted with a mechanical stirrer, dropping funnel and reflux condenser. To the dinitrodiphenyl ether was added 200 ml. of concentrated nitric acid. Red fuming nitric acid (400 ml.) was added slowly to the stirred mixture over a period of 2 hours while maintaining the temperature of the mixture below 75° C., after which the cooling bath was removed and the mixture was stirred for an additional 30 minutes following which the temperature of the stirred reaction mixture was maintained between 75° C. and 80° C. for an additional period of two hours to complete the nitration to the trinitro derivative. The product was then diluted with two liters of water and the diluted viscous product phase was stirred to extract nitric acid. The water was decanted and the viscous product was washed twice with water and once with a 5% NaOH solution. The residue obtained by decanting the water was extracted with a liter of boiling alcohol to remove unreacted dinitrodiphenyl ether and filtered. The insoluble residue was trinitrodiphenyl ether. An analysis for nitrogen content of this product showed 13.5% nitrogen (theoretical=13.7%).

PREPARATION OF NITRATED DOWTHERM A

The same general procedure as that described in Example 2 was used for nitrating Dowtherm A except that the Dowtherm was dissolved in a mixture of concentrated sulfuric acid and concentrated nitric acid before addition of the fuming nitric acid, the amount of fuming acid, temperature and time being adjusted to the degree of nitration desired. It was found to be impossible to obtain directly pure trinitro Dowtherm A in a one stage nitration step. The first nitration stage gave a mixture of mono and dinitro Dowtherm A. This mixture was isolated and mono Dowtherm A was recovered by fractional crystallization from ethyl alcohol in which it is more soluble than the dinitro derivative at ambient temperatures. The trinitro Dowtherm A was obtained by nitrating with fresh acid the dinitro Dowtherm A so separated. Mixtures of mononitro, dinitro and trinitro Dowtherm A were produced by a second stage nitration of the non-separated first stage nitration product using fresh acid for the second stage nitration. The nitrogen analyses of nitro Dowtherm A products used as plasticizers in plasticizing polymeric materials described herein as shown below:

| Intermediate | Product | Nitrogen | |
|---|---|---|---|
| | | Found | Theory |
| Dowtherm A | Mononitro-Dowtherm A | 6.3 | 6.5 |
| Do | Mixed Dinitro-Dowtherm A | 11.0 | 10.9 |
| Do (Two Stage.) | Trinitro-Dowtherm A | 13.1 | 13.7 |

In general the compositions were produced according to the following procedure:

Between 10 and 20 grams of the plasticizer material which consisted of the nitrodiphenyl ether per se or mixtures of the nitrodiphenyl ethers with the adjunct plasticizer were heated in a beaker to a temperature sufficient to produce a homogeneous product, usually from about 120° C. to about 150° C. Weighed amounts of thermoplastic polymers were then added incrementally to the mixture while stirring the mixture with a standard 200° C. thermometer with bulb diameter of 5 to 6 millimeters. Stirring and heating were continued until a homogeneous mixture was obtained, after which heating was discontinued and the homogeneous product was permitted to cool while being stirred. The temperature of incipient solidification is designated as the drop point in this specificaton and claims based thereon. For cellulose esters this drop point is that temperature at which the liquid ceases to drop from the withdrawn thermometer. For other products the drop point is marked by appearance of rubbery properties. This temperature can be duplicated to ±2 degrees centigrade.

The drop point of the plasticized compositions of this invention are generally within the range of from about 75° C. to about 125° C. The addition of the adjunct plasticizer usually lowers the gelation temperature or drop points below that of the product composed of resin and nitrodiphenyl ether in absence of said adjunct plasticizer.

In order to evaluate the quality of the plasticized composition after the drop point was determined, the mixture was remelted and poured onto a glass surface to form a slightly convex film 2 to 3 inches in diameter and of average thickness about 5 mm. This film was permitted to cool to ambient temperature, i.e., about 25° C. and was then stripped from the glass surface. The rigidity of the plasticized product is a measure of the tendency of the plasticized product to maintain its form at room temperature over a period of at least 24 hours. Soft products usually show cold flow by the end of such period. In general, the plasticized products of this invention are relatively hard and do not exhibit cold flow. Closely related to absence of cold flow is pliability and the product must be pliable without brittleness. A product requiring considerable manual effort to tear was rated as good in this respect. In addition to the above properties the finished plasticized compositions were observed over a period of several days to determine the extent, if any, of syneresis of plasticizer material. Syneresis of plasticizer or separation of either thermoplastic resin or plasticizer indicates a mixture containing unbalanced proportions and unplasticized material. Syneresis was not present in the plasticized products of this invention.

We have prepared plasticized compositions using as plasticizer 2,4-dinitrodiphenyl ether and, as polymeric synthetic resins, lacquer grade cellulose acetate, cellulose acetate-butyrate, polyvinyl acrylonitrile resins and mixtures of these. Plasticized asphalt compositions containing minor amounts of vistanex i.e., up to 10% by weight of the compositions, were also prepared using 2,4-dinitrodiphenyl ether as the plasticizer. These compositions were prepared according to the above-described method of heating the plasticizer and adding thereto the polymeric material. The composition of these plasticized materials and the drop points are shown in Table I.

Table I.—Plasticized polymers—2,4-dinitrodiphenyl ether plasticizer

| Experiment | Polymer | Percent | DNDPO[2] (percent) | Drop Point (° C.) |
|---|---|---|---|---|
| 1 | Cellulose Acetate-Butyrate | (33) | (67) | 120 |
| 2 | Cellulose Acetate | (28) | (72) | 128 |
| 3 | Polyvinyl Chloride | (25) | (75) | 105 |
| 4 | Polyvinyl Butyral | (30) | (70) | 124 |
| 5 | Polyvinyl Acetate | (40) | (60) | 70 |
| 6 | Polymethylmethacrylate | (25) | (75) | 104 |
| 7 | Polyvinyl Chloride / Polymethylmethacrylate | 12.5 / 12.5 | (75) | 105 |
| 8 | Cellulose Acetate-Butyrate / Polyvinyl Chloride | 12.5 / 12.5 | (75) | 107 |
| 9 | Styrene-acrylonitrile | (30) | (70) | 100 |
| 10 | Asphalt[1] (60%) / Vistanex-100 (10%) | (70) | (30) | 75 |
| 11 | Asphalt[1] (20%) / Cellulose Acetate-Butyrate (24%) | (44) | (56) | 85 |

[1] Asphalt—Described in Example 6 below.
[2] DNDPO—2,4-dinitrodiphenyl ether.

The above compositions were homogeneous and when cooled to ambient temperatures showed no tendency to synerize 2,4-dinitrodiphenyl ether from the plasticized compositions.

A particularly effective thermoplastic polymeric material which can be plasticized using the nitrodiphenyl ether plasticizers, without or with the use of an adjunct plasticizer, is polyvinyl chloride. Such a composition containing dinitrotoluene adjunct is described in Example 1 below. The polyvinyl chloride used was a commercial grade. The resin is a white powder, 95% of which passes through a 100 mesh Tyler screen. The resin has a specific viscosity in the range of from .52 to .58 at 20° C. The specific viscosity is determined by use of an Ostwald pipette with nitrobenzene as reference liquid. A 0.484% solution of the sample in the nitrobenzene is used. The specific viscosity is calculated from the expression $$\frac{T_1}{T_2} - 1$$

where $T_1$ is the time of flow of the sample and $T_2$ equals time of flow of nitrobenzene reference liquid.

EXAMPLE 1

To a heated mixture of plasticizer material consisting of 37.5 parts by weight of 2,4-dinitrodiphenyl ether and 37.5 parts by weight of dinitrotoluene was added 25 parts by weight of polyvinyl chloride. The product was homogeneous and when cooled a thin film was very rubber-like. The film exhibited excellent non-tear properties. The drop point was 115° C. Plasticized compositions consisting essentially of from about 20% to about 40% by weight of polyvinyl chloride, from about 25 to about 50% by weight of 2,4-dinitrodiphenyl ether and from about 25% to about 50% by weight of dinitrotoluene are pliable and show good tear properties. Excellent plasticized compositions may also be prepared from mixtures of polyvinyl chloride with approximately equal parts by weight of nitrodiphenyl ethers and dinitrotoluene, the amount of polyvinyl chloride in the plasticized mixture being within the range of from about 20% to about 40% of the plasticized composition.

A product of excellent rubber-like and excellent tear properties was also obtained when a plasticized polymethylmethacrylate product containing 25% by weight of this resin and 2,4-dinitrodiphenyl ether and dinitrotoluene in equal percents by weight was prepared as described in Example 1. The drop point was 110° C. A styrene-acrylonitrile copolymer plasticized according to the above procedure with 2,4-dinitrodiphenyl ether and dinitrotoluene in a 30% styrene-acrylonitrile containing product wherein equal parts by weight of the dinitrodiphenyl ether and dinitrotoluene were used as plasticizer material, that is, a 30%—35%—35% plasticized product, exhibited excellent pliability, excellent rigidity and excellent tear properties. The drop point of this composition was 100° C. Plasticized polyvinyl chloride compositions consisting of 25% by weight of polyvinyl chloride and 75% by weight of 2,4-dinitrodiphenyl ether have drop points of about 105° C. and similar compositions containing 25% by weight of polymethylmethacrylate and 75% by weight of this dinitrodiphenyl ether have drop points of about 104° C.

EXAMPLE 2

A plasticized cellulose acetate-butyrate polymer which analyzed about 28% acetic acid and about 33% butyric acid was plasticized with 2,4-dinitrodiphenyl ether by adding to 67 parts by weight of the molten 2,4-dinitrodiphenyl ether, 33 parts by weight of the cellulose acetate-butyrate according to the above-described general method of preparing plasticized compositions. A homogeneous, plasticized molten mixture having a drop point of 120° C. was obtained. A film of the cooled product was given a rating of good with respect to rigidity and tear properties and the product showed negative cold flow and showed no tendency to synerize. A plasticized composition prepared by the same procedure but consisting of 33% by weight of this cellulose acetate-butyrate resin and 67% by weight of orthonitrodiphenyl ether exhibited good tear properties as did also a plasticized composition consisting of 32% by weight of this resin, 34% by weight of the 2,4-dinitrodiphenyl ether and 34% by weight of dinitrotoluene adjunct plasticizer.

EXAMPLE 3

A lacquer grade cellulose acetate polymer which analyzed between 54 and 56 percent acetic acid was plasticized with mixtures of 2,4-dinitrodiphenyl ether and the polyesterification product of ethylene glycol with diglycolic acid, that is, ethylene glycol diglycolate polyester. The 2,4-dinitrodiphenyl ether was added to the ethylene glycol diglycolate polyester and the cellulose acetate was then added to the two component plasticizer materials at temperatures within the range of 120° to 140° C. The homogeneous mixtures of 2,4-dinitrodiphenyl ether with ethylene glycol diglycolate were stirred during the addition of the cellulose acetate. Seven plasticized compositions were prepared which varied in cellulose acetate content from 20% to 44% by weight, in glycol diglycolate content, from 22% to 46% by weight, and from 30% to 45% by weight of 2,4-dinitrodiphenyl ether. The plasticized compositions varied from 103° C. to 120° C. in drop point and were rated as good with respect to rigidity and tear and were non-synerizing homogeneous plasticized compositions.

The dialkyl phthalate esters are suitable adjunct plasticizers when used in conjunction with the nitrodiphenyl ethers, particularly the dinitrodiphenyl ethers, for the plasticizing of cellulose acetate. Dioctyl phthalate may be used to advantage with 2,4-dinitrodiphenyl ether for plasticizing polyvinyl chloride resin, polymethylmethacrylate resin or mixtures of these to produce plasticized compositions containing from 20% to about 40% of the mixture of these synthetic resins, the ratio of 2,4-dinitrodiphenyl ether to dioctyl phthalate being within the range of from about one to one to about five to one.

EXAMPLE 4

A sample of the cellulose acetate described in Example 3 was plasticized by heating about equal weights of the cellulose acetate, 2,4-dinitrodiphenyl ether and diethyl phthalate, according to the above-described procedure. A plasticized composition having good properties with respect to pliability, rigidity and resistance to tear was obtained. The drop point was 119° C. Substitution of dinitrodowtherm for the 2,4-dinitrodiphenyl ether in a second composition produced a plasticized composition having equally good properties. The drop point of the composition was 120° C.

EXAMPLE 5

A plasticized composition consisting of equal parts by weight of trinitrodiphenyl ether, dimethylphthalate and the cellulose acetate resin described in Example 3 was prepared according to the above described method of heating and stirring mixtures of the resin and plasticizer material. The trinitrodiphenyl ether was prepared by nitrating 2,4-dinitrodiphenyl ether according to the procedure described above. The product had a drop point of 120° C. and was rated as good with respect to rigidity and tear properties. A similar plasticized composition containing 40% by weight of a sample of the same cellulose acetate, 30% by weight of the trinitrodiphenyl ether and 30% by weight of diethylene glycol prepared by the same method had a drop point of 120° C. and likewise was rated as good with respect to rigidity and tear properties.

EXAMPLE 6

A mixture consisting of 60 parts by weight of asphalt, 10 parts by weight of vistanex and 30 parts by weight of 2,4-dinitrodiphenyl ether was stirred and heated at a temperature of 120° C. to 140° C. until a homogeneous plasticized product was obtained. The product was rubberlike with respect to pliability and exhibited good tear properties. It had a drop point of 75° C. The asphalt used was a roofing and coating grade product obtained by airblowing a midcontinent petroleum residuum stock.

The asphalt corresponded to the following specifications for such grade asphalt.

Softening point 215°–235° F.
A.S.T.M. penetration test:
    At 32° F.—Not less than 0.8 mm.
    At 77° F.—1.5 mm. to 2.2 mm.
    At 115° F.—Not more than 4.0 mm.
Solubility in $CCl_4$—Not less than 99%
Specific gravity—Not less than 1.000.
Flash point (Cleveland Open Cup)—Not less than 550° F.
Loss of 50 gram sample
Heated for 5 hours at 325° F.—Not more than 0.1%.

A plasticized composition consisting of 24% by weight of cellulose acetate-butyrate resin described in Example 2, 20% by weight of the above asphalt and 56% by weight of 2,4-dinitrodiphenyl ether had a drop point of 85° C. and was rated good with respect to pliability, rigidity and tear properties.

EXAMPLE 7

Two component plasticized compositions consisting of cellulose acetate-butyrate resin with nitrodowtherm plasticizers were prepared by adding the resin to the plasticizer; stirring and heating the mixtures at temperatures in the 120° C.–140° C. range. The cellulose acetate-butyrate was of the same grade as described in Example 2. The proportions by weight and drop points are tabulated below.

| Resin (percent) | Plasticizer (percent) | Drop Point, °C. |
|---|---|---|
| CAB [1] (30) | Dinitrodowtherm A (70) | 124 |
| CAB (33) | Mononitrodowtherm A (67) | 118 |

[1] Cellulose acetate-butyrate.

These compositions were rated as good with respect to rigidity and tear properties.

Samples of laboratory grade nitrocellulose were plasticized with 2,4-dinitrodiphenyl ether and with mixtures of 2,4-dinitrodiphenyl ether and dinitrotoluene according to the procedure described in Example 8 below. The nitrocellulose, that is cellulose nitrate, analyzed about 10% nitrogen. The 2,4-dinitrodiphenyl ether was a recrystallized product of high purity prepared as described above from 2,4-dinitrochlorobenzene and phenol. The dinitrotoluene was a commercial grade product.

EXAMPLE 8

To 100 milliliters of acetone was added 10 grams of cellulose nitrate. The mixture was stirred and complete solution, about 108 milliliters, of the cellulose nitrate was obtained. To 25 milliliters of the solution containing about 2.3 grams of the cellulose nitrate was then added 0.5 gram of 2,4-dinitrodiphenyl ether. The solution was stirred and poured into a Petri dish. The acetone solvent was evaporated at room temperature. A plasticized transparent thin film of cellulose nitrate, which showed no tendency to separate cellulose nitrate or 2,4-dinitrodiphenyl ether, was obtained. In a second experiment a mixture of 1.25 grams of the 2,4-dinitrodiphenyl ether and 1.25 grams of dinitrotoluene was added to 25 milliliters of the acetone solution. The acetone solvent of the solution containing the 2.3 grams of cellulose nitrate and 1.25 grams each of the 2,4-dinitrodiphenyl ether and dinitrotoluene was evaporated from the solution in a Petri dish. A thin, transparent film of plasticized cellulose nitrate was obtained.

The experiments of Example 8 show compatability of the 2,4-dinitrodiphenyl ether with cellulose nitrate, and compatability of 2,4-dinitrodiphenyl ether dinitrotoluene mixtures with the nitrate. The results show that the nitrodiphenyl ethers, particularly the 2,4-dinitrodiphenyl ether, is useful as a plasticizer for cellulose nitrate containing compositions. Such compositions may contain from about 40% to about 80% by weight of this cellulose nitrate and about 20% to about 60% of the 2,4-dinitrodiphenyl ether. Adjunct plasticizers such as those described above, particularly dinitrotoluene, may be used in compositions containing cellulose nitrate and the nitrodiphenyl ether in amounts within the range of from 20 to about 70 percent by weight of adjunct plasticizer based on total nitrodiphenyl ether and adjunct plasticizer. The inclusion of the 2,4-dinitrodiphenyl ether as sole plasticizer or along with dinitrotoluene as a plasticizer material for the cellulose nitrate is useful in the manufacture of shaped powder grains, such as cannon powder grains, smokeless powder grains, sporting powder grains and the like. Particularly 2,4-dinitrodiphenyl ether may be used alone or associated with dinitrotoluene in such compositions.

Additional thermoplastic compositions containing dinitrodiphenyl ether plasticizers, one or more thermoplastic polymeric materials and one or more adjunct plasticizers are listed in Table II. These compositions were rated good with respect to rigidity and tear properties and exhibited no tendency to synerize plasticizer material.

Table II

| Thermoplastic Synthetic Resin | Percent | Plasticizer | Percent | Adjunct | Percent | Drop Point, °C. |
|---|---|---|---|---|---|---|
| Cellulose Acetate [1] | (42) | 2,4-dinitrodiphenyl ether | (25) | Dimethoxy tetraglycol | (33) | 122 |
| Do. [1] | (40) | Dinitrodowtherm A | (30) | Triethylene glycol diacetate | (30) | 120 |
| Do. [1] | (30) | 2,4-dinitrodiphenyl ether | (35) | Diethylene glycol | (35) | 85 |
| Do. [1] | (30) | ----do---- | (35) | Dinitrotoluene | (35) | 106 |
| Do. [1] | (30) | ----do---- | (35) | Dinitrophenyl propyl ether | (35) | 118 |
| Polyvinyl Chloride [2] | (25) | ----do---- | (44) | Dinitrotoluene | (31) | 105 |
| Do. [2] | (25) | ----do---- | (37.5) | Dinitrophenyl allyl ether | (37.5) | 95 |
| Polyvinyl Acetate | (40) | ----do---- | (20) | Triethylene glycol di-2-ethylhexoate | (40) | 120 |
| Polystyrene | (30) | ----do---- | (41) | Dinitrotoluene | (29) | 95 |
| Polymethylmethacrylate<br>GRS Rubber | (27.1)<br>(18.8) | ----do---- | (43.3) | Dioctylphthalate | (10.8) | |
| Polymethylmethacrylate<br>GRS Rubber | (15)<br>(15) | ----do---- | (34.2) | Ethylene glycol diglycolate<br>Dimethylphthalate | (22.5)<br>(13.3) | 115 |

[1] Cellulose acetate as described in Example 3.
[2] Lacquer grade (Geon 101).

Although we have described our plasticized compositions as containing the nitrodiphenyl ether plasticizers and sole adjunct plasticizer in a given composition, we do not wish to be limited to the use of only one adjunct in a given composition. Just as a combination of more than one of the thermoplastic polymeric materials such as polyvinyl resins and polymethylmethacrylate resins is contemplated as part of this invention and also the incorporation of more than one of the defined nitrodiphenyl ethers in a given plasticized composition is contemplated as coming within the scope of our invention, so more than one adjunct may be present in the composition. Thus we have found that minor amounts up to 10% by weight based on weight of the plasticized composition, of the dialkyl phthalates or nitrodialkyl phthalates, or glycol diacetate, or the acetins, or nitromethylpropanediol diacetate, when used with the nitrodiphenyl ether plasticizer and the ethylene glycol diglycolate adjunct in plasticizing cellulose acetate polyester, results in a plasticized product having lower drop temperatures than when these are not present in the composition.

Having thus described our invention, we claim:

1. A thermoplastic composition consisting essentially of a polymeric material selected from the class consisting of cellulose esters, polyvinyls, methylmethacrylates and mixtures thereof and a plasticizer selected from the class consisting of mononitrodiphenyl ether, dinitrodiphenyl ether, mixtures of mononitrodiphenyl ether and dinitrodiphenyl ether, and mixtures of the foregoing with trinitrodiphenyl ether in which trinitrodiphenyl ether-containing mixtures there is an average of less than 2.5 nitro groups per molecule, wherein said polymeric material is present in an amount of about 20–80 and said ether is present in an amount of about 80–20 percent by weight respectively of said composition.

2. The composition of claim 1 wherein said polymeric material is cellulose acetate.

3. The composition of claim 1 wherein said ether is 2,4-dinitrodiphenyl ether.

4. The thermoplastic composition of claim 1 wherein said nitrodiphenyl ether is admixed with an adjunct material selected from at least one oxygen-containing organic material consisting of (1) esters of polyhydric alcohols, (2) polyglycols, (3) alkyl ethers of polyglycols, (4) aliphatic ethers of nitrophenols, (5) esters of polycarboxylic acids and (6) nitromonocyclic aromatic compounds, said adjunct material constituting from about 20% to about 70% by weight of said mixture of nitrodiphenyl ether and adjunct material.

5. A thermoplastic composition consisting essentially (A) from about 20% to about 60% by weight of cellulose acetate-butyrate polymer, which analyzes between about 7% and about 55% by weight of acetic acid and between about 16% and 61% by weight of butyric acid, and (B) from about 40% to about 80% by weight of a plasticizer selected from the class consisting of mononitrodiphenyl ether, dinitrodiphenyl ether, mixtures of mononitrodiphenyl ether and dinitrodiphenyl ether and mixtures of the foregoing with trinitrodiphenyl ether in which trinitrodiphenyl ether containing mixtures there is an average of less than 2.5 nitro groups per molecule.

6. A composition of matter consisting essentially (A) between about 20% and about 40% by weight of cellulose acetate, which analyzes between 51% and 57% by weight of acetic acid; (B) between about 20% and 60% by weight of the polyester condensation product of (i) at least one dihydric alcohol selected from the class consisting of ethylene glycol, propylene glycol, polypropylene glycol, n-butylene glycol and poly-n-butylene glycol, which polyglycols have a molecular weight of less than 400 and (ii) at least one acid selected from the class consisting of aliphatic dicarboxylic acids and aliphatic oxydicarboxylic acids, which acids contain two to six carbon atoms and wherein the mol ratio of said alcohol to said acid is between about 1.02 to 1.3; and (C) between about 20% and 60% by weight of a plasticizer selected from the class consisting of mononitrodiphenyl ether, dinitrodiphenyl ether, mixtures of mononitrodiphenyl ether and dinitrodiphenyl ether, and mixtures of the foregoing with trinitrodiphenyl ether in which trinitrodiphenyl ether-containing mixtures, there is an average of less than 2.5 nitro groups per molecule.

7. The composition of matter as described in claim 6 wherein the polyester condensation product consists essentially of ethylene glycol diglycolate.

8. A thermoplastic composition consisting essentially of (A) from about 20% to about 40% by weight of polyvinyl chloride, (B) from about 25% to about 50% by weight of 2,4-dinitrodiphenyl ether and (C) from about 25% to about 50% by weight of dinitrotoluene.

9. A thermoplastic composition which consists essentially of (A) from about 40% to about 80% by weight of cellulose nitrate and (B) from about 20% to about 60% by weight of 2,4-dinitrodiphenyl ether.

References Cited in the file of this patent

UNITED STATES PATENTS

| | | |
|---|---|---|
| 1,703,915 | Zitscher | Mar. 5, 1929 |
| 1,877,301 | Grether | Sept. 13, 1932 |
| 2,008,987 | Marx et al. | July 23, 1935 |
| 2,095,619 | Stoesser et al. | Oct. 12, 1937 |
| 2,182,827 | Smith | Dec. 12, 1939 |
| 2,359,103 | Gerhart et al. | Sept. 26, 1944 |
| 2,553,308 | Faulkner | May 15, 1951 |
| 2,585,750 | Doelling | Feb. 12, 1952 |

OTHER REFERENCES

Monsanto Adv. Chemical and Metallurgical Engr., April 1946, p. 149.

Reiford et al.: J. Amer. Chem. Soc., vol. 48, p. 2660, 1926.